US007631825B2

(12) United States Patent
Pallmann

(10) Patent No.: US 7,631,825 B2
(45) Date of Patent: Dec. 15, 2009

(54) TWO-STEP COMMINUTING APPARATUS FOR CUTTABLE MATERIAL

(75) Inventor: Hartmut Pallmann, Zweibruecken (DE)

(73) Assignee: Pallmann Maschinenfabrik GmbH & Co. KG, Zweibruecken (DE)

( * ) Notice: Subject to any disclaimer, the term of this patent is extended or adjusted under 35 U.S.C. 154(b) by 594 days.

(21) Appl. No.: 11/253,688

(22) Filed: Oct. 20, 2005

(65) Prior Publication Data

US 2006/0081730 A1 Apr. 20, 2006

(30) Foreign Application Priority Data

Oct. 20, 2004 (DE) ...................... 10 2004 051 217

(51) Int. Cl.
*A01F 29/00* (2006.01)
*B02C 19/00* (2006.01)
*B03B 7/00* (2006.01)

(52) U.S. Cl. ................................ 241/101.4; 241/152.2

(58) Field of Classification Search ............. 241/152.1, 241/152.2, 101.4; 83/408
See application file for complete search history.

(56) References Cited

U.S. PATENT DOCUMENTS 894,981 A * 8/1908 Ponsar et al. ............ 241/101.4
1,938,500 A * 12/1933 Schur ...................... 241/152.1
2,660,962 A * 12/1953 Bloxham ..................... 83/157
2,889,878 A * 6/1959 White et. al. .................. 83/165
3,254,687 A * 6/1966 Tertyshnikov .............. 241/88.2
3,392,923 A 7/1968 Reinecker et al.
3,584,796 A * 6/1971 Earle et al. ...................... 241/4
4,355,765 A * 10/1982 Parker et al. ............. 241/152.2
4,476,185 A * 10/1984 Spittle ........................ 442/402
5,390,862 A * 2/1995 Eglin .......................... 241/29
5,452,860 A * 9/1995 Williams ..................... 241/78
6,487,949 B1 * 12/2002 Dharia ........................ 83/213
7,201,339 B2 * 4/2007 Ford ............................ 241/92

FOREIGN PATENT DOCUMENTS

DE 1 298 867 7/1969
DE 1 679 811 12/1971
DE 1679811 B * 12/1971
DE 144 001 9/1980
DE 279 212 A1 5/1990

* cited by examiner

*Primary Examiner*—Bena Miller
(74) *Attorney, Agent, or Firm*—Muncy, Geissler, Olds & Lowe, PLLC

(57) ABSTRACT

An apparatus for comminuting large pieces of cuttable material, particularly bales of rubber, is provided. The apparatus includes a first comminuting stage for carrying out a pre-comminuting, and a second comminuting stage for carrying out a fine comminuting, whereby the second comminuting stage includes a comminuting system that rotates around an axis of rotation, to which the material is conveyed via a supply channel. The first comminuting stage is integrated in the supply channel to the second comminuting stage. In this way, a largely even feeding of material to the second comminuting stage can be achieved so that comparatively low machine performances are sufficient and the performance capacity of the second comminuting stage can be better utilized.

27 Claims, 5 Drawing Sheets

TWO-STEP COMMINUTING APPARATUS FOR CUTTABLE MATERIAL

This nonprovisional application claims priority under 35 U.S.C. § 119(a) on German Patent Application No. DE 2004051217, which was filed in Germany on Oct. 20, 2004, and which is herein incorporated by reference.

BACKGROUND OF THE INVENTION

1. Field of the Invention

The present invention relates to an apparatus and a cutting unit for comminuting large pieces of cuttable material 2. Description of the Background Art The purpose of industrial comminuting of material is oftentimes the fabrication of an intermediate product of defined shape and size, which is subsequently used as source material for the production steps of another production process. The production of granulate is an example, which is further processed in extrusion devices. The uniformity in shape and size are thereby the determining factors for the quality of the intermediate product.

The operators of comminuting devices are regularly presented with a challenge, when large pieces of material, for example, bales of rubber, are to be reduced to a relatively small end size, for example, to granules. Generally, multi-step comminuting is used for applications of this kind, whereby several cutting mills of varying size, one behind the other, are provided. The end product of the previous cutting mill thereby serves as the source material for the next cutting mill. In this way, a step-by-step comminuting of the material to the desired end size takes place.

The advantage of this method is that it yields high-quality granulate material. The disadvantages, however, are economical because several cutting mills have to be on hand. Due to the need and operation of several comminuting machines, there are, apart from the expenditures for their acquisition, maintenance, and operation, additional costs for the required surge tank capacities, means of transportation, and the additional space requirement.

To circumvent these disadvantages, devices have been made for special applications, for example, the comminuting of bales of rubber, which make it possible to comminute inside a housing the original material to the desired fineness of the end product. Devices of this kind have a rotating, cylinder-shaped rotor provided with axially oriented knives, which are evenly distributed around its periphery moving in a mutual blade flight circle. For the purpose of comminuting, the knives interact with stator knives, which are tangent to the blade flight circle. A perforated strainer is arranged over a partial area of the blade flight circle, via which the sufficiently comminuted material is discharged. During comminuting, the material remains in the cutting area of the knife until the particles are small enough to pass through the perforations of the strainer. In other words, in devices of that kind, the pre and post comminuting is done simultaneously with one piece of equipment with the same comminuting tools.

One of the advantages thereof is the need for only one comminuting device, which in contrast with the previously described multi-step variation is a cost and space-saving way of comminuting. However, the consequence of the one-step comminuting is that the entire comminuting process, that is, coarse and fine comminuting, is done by the same comminuting tools. However, since the individual comminuting steps have different objectives due to different initial conditions, it would be desirable in view of quality improvement to adjust the respective comminuting tools to the specific requirements of each comminuting step by using particularly suitable comminuting tools. This would not be possible with one-step comminuting, which is the reason why, from a technical viewpoint, one-step comminuting is a compromise.

An additional factor in the comminuting of bales of rubber or extruded synthetic hollow sections is that for the initial cutting of the material, very high forces must be applied to make comminuting possible. During that process, high impact forces are applied to the material by the comminuting tools. These cause extremely high mechanical stress, which must be taken into consideration in regard to the dimensional design of the device. Furthermore, this way of comminuting characteristically generates considerable noise, which makes it necessary to encapsulate the device to protect the personnel.

Additionally, the resistance encountered at the initial cutting of the material by the comminuting tools causes a reduction of the rotational speed of the comminuting rotor. To offset this loss of rotational speed, a strong short-term power surge to the drive motor occurs. Since energy costs are calculated not by the average energy consumption but by peak demand, this leads to a superproportional increase in energy costs.

SUMMARY OF THE INVENTION

It is therefore an object of the present invention to comminute large pieces of material in an economical way, without having to make sacrifices with regard to the quality of the end product.

The invention is based on the idea to carry out the comminuting of the material in two steps, whereby a pre-comminuting device is arranged in a material delivery unit of the fine-particle comminuting device. In this way, it is possible to combine the benefits of two-step comminuting with the benefits of a one-step comminuting device.

As a result of the step-by-step comminuting of the material, the determining factors for each comminuting step remain constant for the most part during the comminuting process. By introducing material that is defined in shape and size, it is possible to adjust the comminuting tools for each comminuting step to the characteristics of the material and the specific requirements for the intermediate or end product to be fabricated.

The result is primarily a high-quality comminuted product, which both in shape and in size remains within narrow tolerances. This is critical for its usability as a source material in other production processes, for example, in extruding.

Furthermore, it makes it possible to always operate a comminuting device of the present invention at its optimal capacity. In this way, performance fluctuations are very considerably reduced, which is noticeable in the largely constant energy intake of the device. Peak consumptions, which are the basis for calculating energy costs, are mostly evened out, which makes an economical comminuting operation possible.

The average comminuting efficiency of the pre-comminuting is not higher than the average comminuting efficiency of the fineness comminuting. At continuous feeding, the comminuting devices of both comminuting steps thus manage the same material throughput. The fluctuation-deficient comminuting thus achieved results in an evenness of the mechanical stress and makes it possible for the designer of devices of the present invention to avoid overdimensioning on account of load peaks. Thus, devices of the present invention can be constructed smaller and more compact at comparable machine capacities with the benefit of lower production costs and fewer spatial requirements for installation.

In a further embodiment of the present invention, the machine performance of the pre-comminuting device is regulated in dependence from the machine performance of the fine comminuting device, for example, in dependence from the power intake of the drive motor. In this instance, the pre-comminuting device not only has a comminuting function but also a feeder function to assure that the device for fine comminuting operates at optimal capacity.

In a further embodiment of the invention, the fine-comminuting device is preferably provided with a knife that cuts the material in the supply channel into pieces of defined size by linear form-feeding. In contrast to the rotating knives of a cutting mill, this method allows comminuting at a low cutting speed. The beneficial result is that noise emissions occur only to a marginal degree. Furthermore, the knife cutting into the material does not subject the material to impact energy, which due to heat transfer would otherwise lead to a heating of the material and high wear and tear.

Preferred is also the arrangement of the knife inside a slidable frame. The frame stabilizes the knife while cutting through the material, thus assuring a precise cut even at high cutting frequency.

In a further embodiment of the invention, the cutting unit is provided with a frame-shaped knife guide for the knife, that is, for the knife frame. The knife guide can be thereby inserted into the supply channel, which it replaces in this segment. In this way, even existing comminuting devices can be retrofitted in a simple way with a pre-comminuting device.

It is thereby beneficial if part of the knife guide, against which the knife moves, also forms a back stop for the knife blade. The back stop can be a self-contained, replaceable component that is manufactured with high precision and is mounted to the knife guide without tolerance. This assures a precise interaction between the knife and the back stop and thus a total severance of the material.

To operate the knife, a spindle drive or a hydraulic-driven cylinder piston unit is preferred, as this allows a power or path/direction-dependent control of the knife. Beneficially, the power to activate the cutting motion of the knife is derived from two asymmetrically arranged cylinder piston units. The symmetrical loading averts a tilting of the knife, that is, the knife frame during the form-feeding, thus increasing operational safety.

In a particularly beneficial embodiment of the invention, a retaining element for the material is provided below the knife. The retaining element thereby assumes two functions. On the one hand, it keeps the material in a cutting position during the comminuting process. On the other hand, by setting the distance to the knife, it determines the size of the parts to be cut off the material. In order to make the size of the parts to be cut adjustable, the distance between retaining element and knife is adjustable, according to an embodiment of the invention.

Furthermore, it is preferable to couple the activation of the retaining element to the motion of the knife. With a linearly slidable retaining element, this can be achieved by arrangement within the same frame that also serves for the mounting of the knife. Thus, both the knife and the retaining element can be actuated with only one drive in a most simple way.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
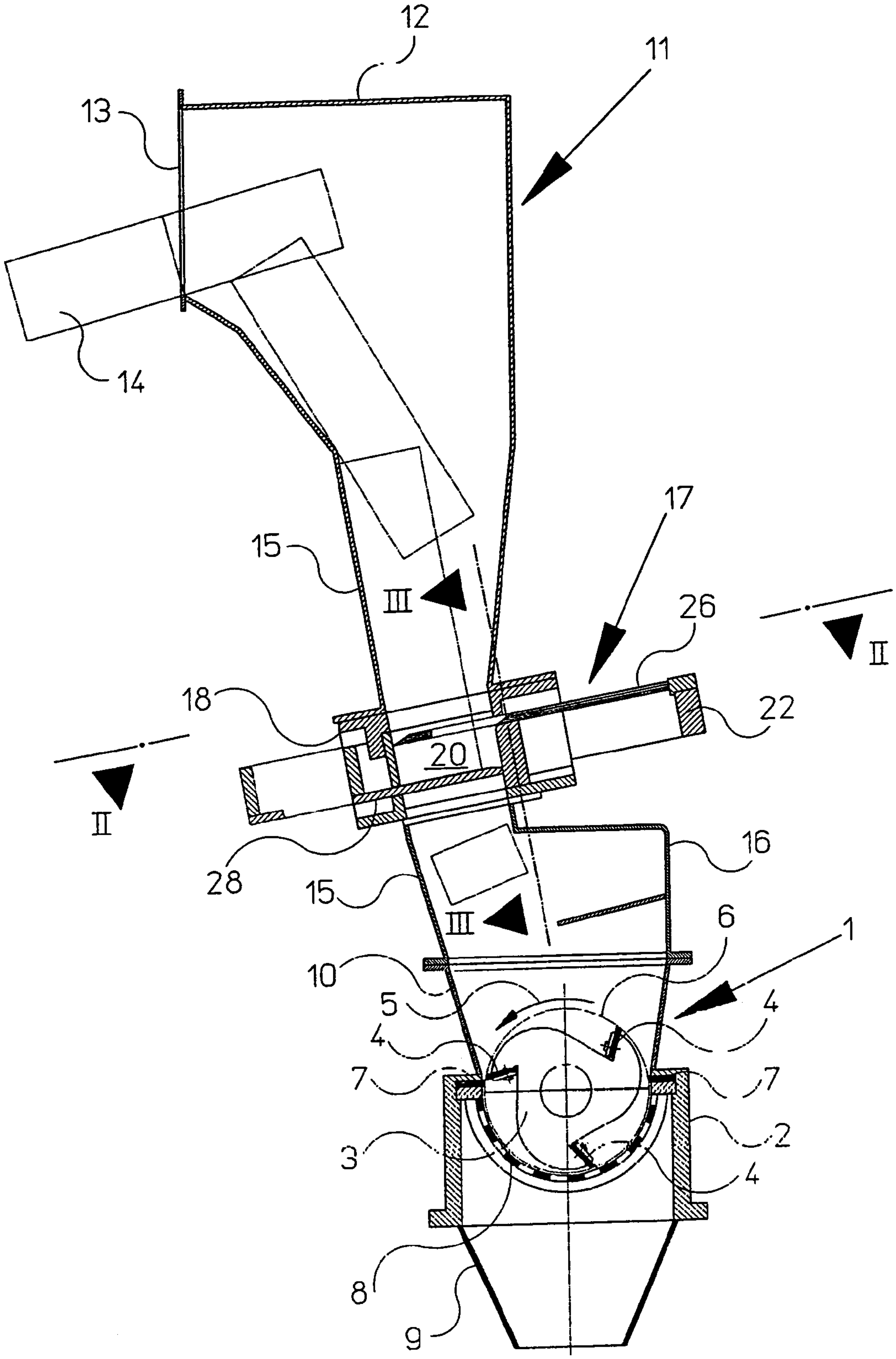
FIG. 1 is a vertical cross section of a device of the present invention.

FIG. 1 shows an example of the implementation of the invention in combination utilizing a cutting mill 1 as a second comminuting step, without being limited to a cutting mill. The cutting mill 1 includes a box-shaped housing 2, which serves as the receptacle for a cutting rotor 3 that is rotatably mounted around a horizontal axis. The cutting rotor 3 has three arms, each supporting a knife 4 that is oriented parallel to the axis of rotation. When the cutting rotor 3 is rotating in the direction of the arrow 5, the knives 4 form a mutual blade flight circle 6.

The comminuting of the material is carried out via two stator knives 7, which are mounted to the housing 2 and are positioned diametrically opposed to one another in relation to the axis of rotation, the cutting edges of which are tangent to the blade flight circle 6. The lower area of the blade flight circle 6 is covered by a perforated strainer 8, through which the sufficiently comminuted material exits the cutting area of the cutting mill 1. Downward from the housing 2, a funnel-shaped material discharge 9 is connected, via which the comminuted material is conveyed from the cutting mill 1 for further processing.

The upper circumference of the cutting rotor 3 is enclosed by a funnel-shaped housing part 10, which is adjacent to the supply system 11 for the material.

The upper segment of the supply system 11 is formed by an intake chute 12, which has a lateral opening 13. The material can be fed to the supply system 11 via the opening 13. The preferred material in FIG. 1 are parallelepiped bales of rubber 14, which can be between 300 and 400 millimeters wide, between 120 and 180 millimeters high, and between 400 and 600 millimeters long, for example.

The intake chute 12 extends downward toward the cutting mill 1 in the shape of a rectangular supply channel 15 and connects with a cap-shaped end piece 16 to the housing part 10 that is open on the top. Via flange connections, a cutting unit 17 is interposed in the supply channel 15 and is thus integrated in the supply system 11.

Figure 2:
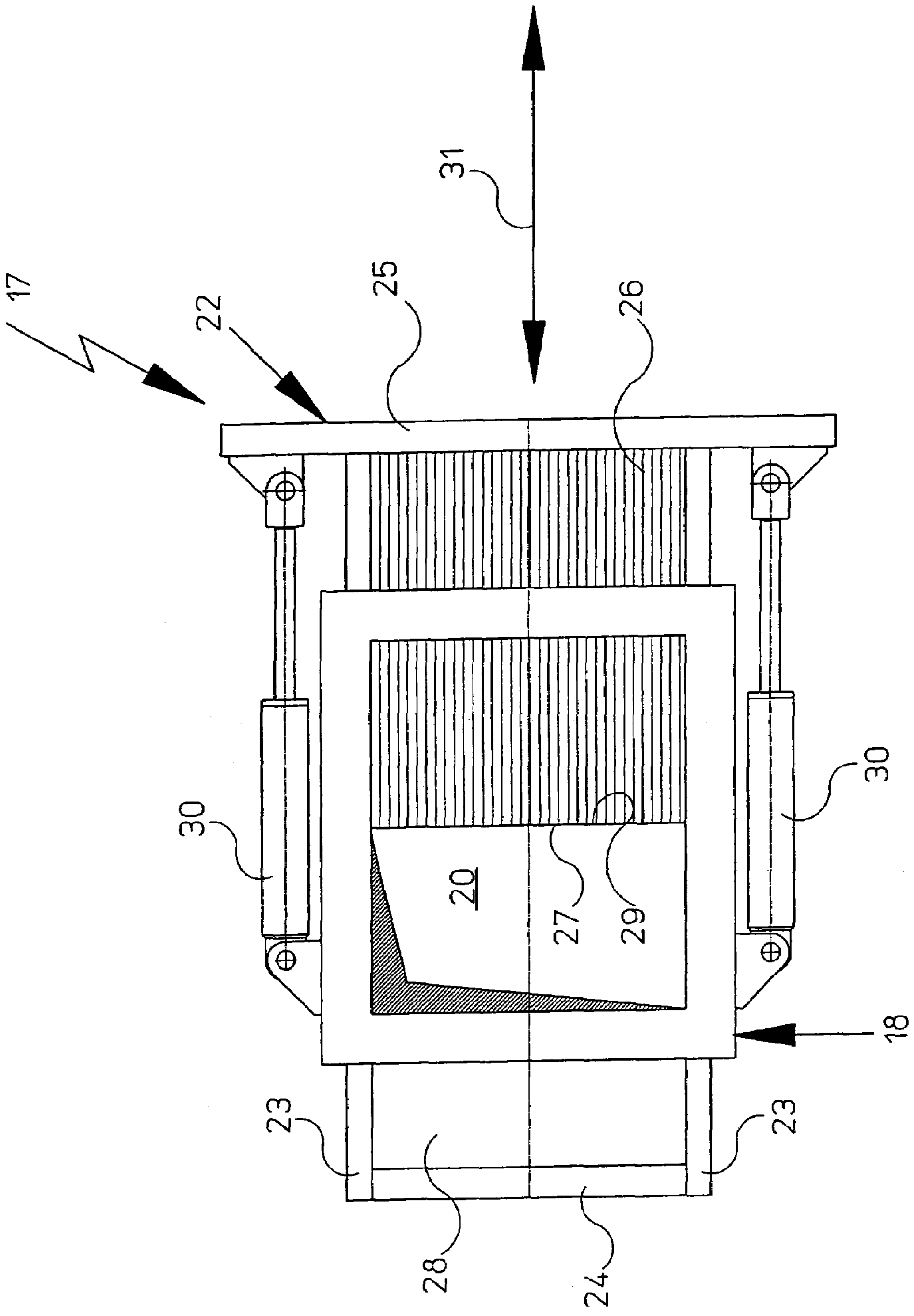
FIG. 2 is a horizontal cross section of the device illustrated in FIG. 1 along the line II-II in the area of the cutting unit.
Figure 3:
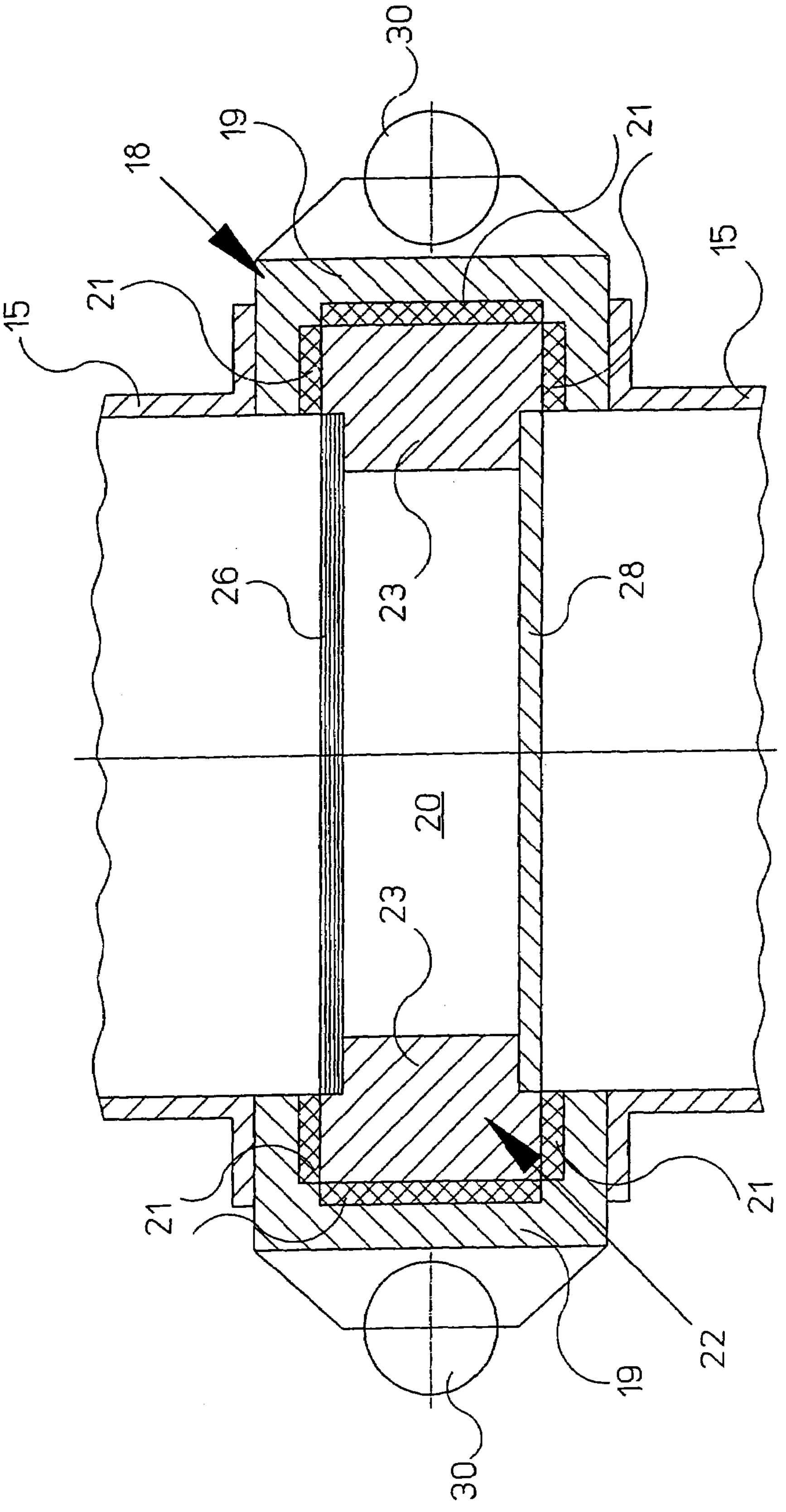
FIG. 3 is a cross section of the device illustrated in FIGS. 1 and 2 along the line III-III.

The detailed construction of the cutting unit 17 is illustrated in FIG. 1 and particularly in FIGS. 2 and 3. The cutting unit 17 comprises a knife guide 18 designed as a closed rectangular frame, which is fixedly attached to the supply channel 15 via circumferential flanges (FIGS. 1 and 3). The opening 20, which is enclosed by the knife guide 18, corresponds to the cross section of the supply channel 15 and forms a cutting chamber. The longitudinal sides 19 of the knife guide 18 are formed by U-sections, the open sides of which point toward the opening 20. The inner sides of the U-section are covered with a slideway lining 21. In this way, the longitudinal sides 19 having slideway linings 21 form a linear guide transversely to the longitudinal axis of the supply channel 15.

Inside the knife guide 18, a knife frame 22 is slidably mounted. The knife frame 22 includes lateral longitudinal spars 23, the ends of which are connected to one another via a crossbeam 24 and a yoke member 25. The yoke member 25 thereby extends beyond the longitudinal spars 23 thus forming a projecting length on both sides.

Commencing at the yoke member 25, the upper side of the knife frame 22 is covered by a knife 26, the blade 27 of which ends approximately at half-length of the knife frame 22. Likewise, commencing at the crossbeam 24, the lower side of the knife frame 22 is covered by a retaining element 28, which with its free edge 29 also ends in the middle of the knife frame 22. Thus, the knife 26 and the retaining element 28 are arranged in plane-parallel planes on top of one another, and the free edge 29 and the blade 27 are aligned with one another in a vertical projection to the frame plane. In this way, the knife frame 22 forms a kind of sled, the one frame half of which is solely taken up by the knife 26, and the other frame half is occupied in a parallel plane and at a distance by the retaining element 28.

The knife frame 22 is slidably arranged within the linear guides of the knife guide 18 via its longitudinal spars 23. To drive the motion of the knife frame 22, two hydraulic cylinder piston units 30 are provided. Their cylinders are fixedly attached to the outer sides of the longitudinal sides 19, whereas their slidable pistons are attached to the projecting segments of the yoke member 25. By activating the cylinder piston units 30, the knife frame 22 can be moved linearly to and from, as indicated by arrow 31. As an alternative, it is also possible to swivel the knife 26 in the knife plane around an axis of rotation that is vertical for this purpose.

Figure 4:
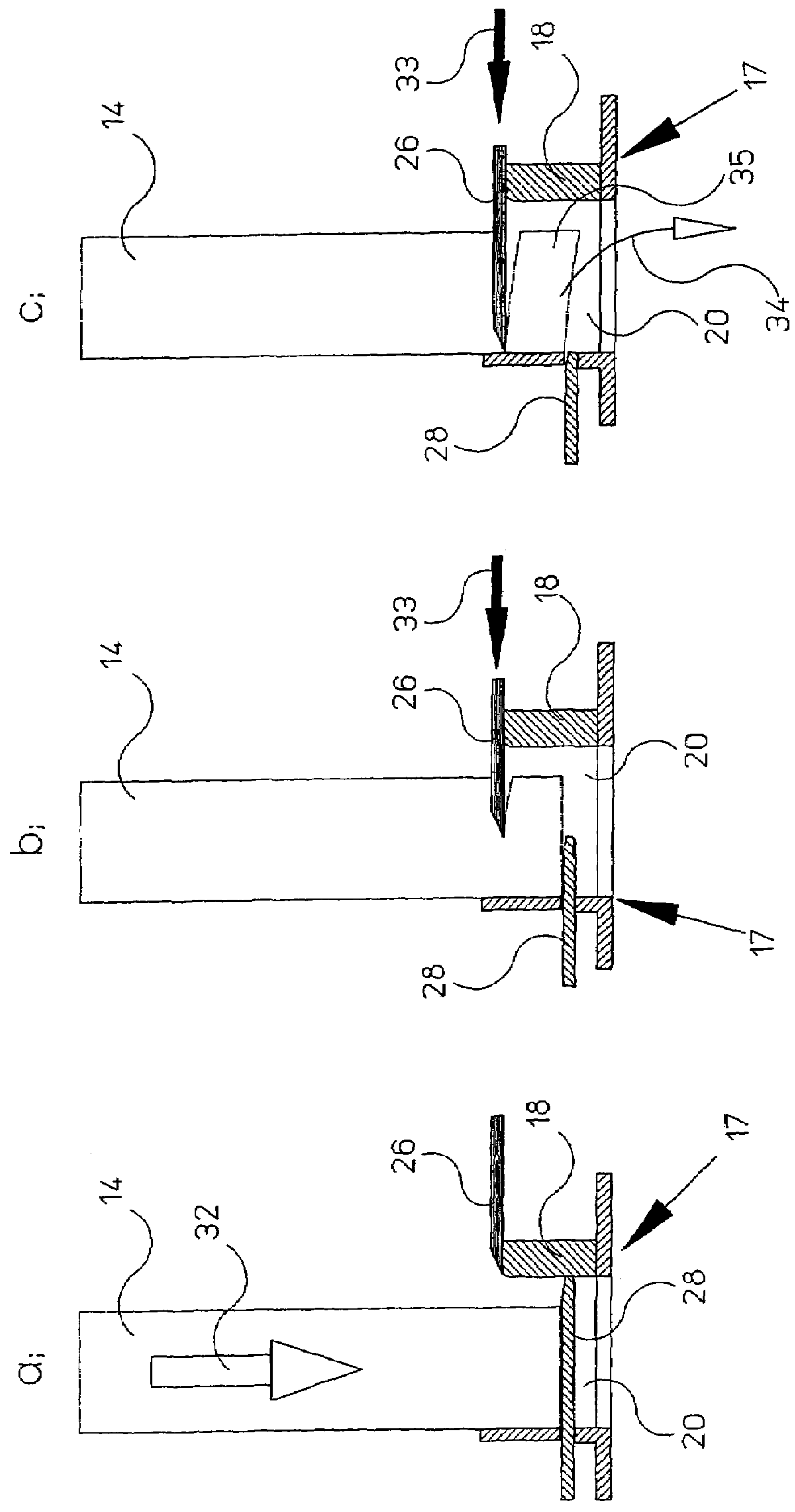
FIG. 4 illustrates various modes of operation during the comminuting process.

FIGS. 4*a* to 4*c* are greatly simplified illustrations of the above-described invention, with the aid of which the method of operation of the cutting unit 17 is therebelow described. FIG. 4*a* thereby shows the initial position of the cutting unit 17 for the feeding of the device with material, here in the form of bales of rubber 14. By extending the cylinder piston unit 30, the knife frame 22 is brought in a first end position, whereby the knife 26 completely deblocks the opening 20, and the retaining element 28 completely closes the opening 20. The free edge 29 of the retaining element 28 thereby abuts to the inner side of the knife guide 18.

As indicated by the arrow 32, a bale of rubber 14 is conveyed lengthwise through the supply channel 17 to the area of the cutting unit 17 until it comes to rest on the retaining element 28.

FIG. 4*b* shows the start of the comminuting process. By running in the cylinder piston units 30, a movement of the knife frame 22 in the direction of the arrow 33 takes place. The knife 26 thereby penetrates the bale of rubber 14. Simultaneously, the retaining element 28 begins to clear the opening 20.

By sustained advance of the knife 26, the cutting unit 17 is put into a second end position. This position, which is achieved by completely running in the cylinder piston units 30, is illustrated in FIG. 4*c*. The knife 26 thereby moves across the entire cross section of the supply channel 15 until the blade 27 abuts to the inner side of the knife guide 18, which is designed as a back stop for the knife 26 for this purpose. The retaining element 28 is complete retracted from the opening 20, thus clearing the entire cross section of the supply channel 15. This allows the severed part 35 of the bale of rubber 14 to be conveyed by force of gravity to the second comminuting step in the direction of the arrow 34, where in the cutting mill 1 fine comminuting takes place.

Once a cutting cycle is completed, the cutting unit 17 is returned to its first end position by extending the cylinder piston units 30, and thus to the starting position for the next cutting cycle. Shifting between two end positions, the knife frame 22 thus executes a sled-like linear movement transversely to the supply channel 15 during the comminuting process, whereby for the feeding of the cutting unit 17, the opening 20 is cleared by the knife 26 and closed by the retaining element 28, and for cutting and further conveying of the material, the opening 20 is closed by the knife 26 and opened by the retaining element 28.

Further, the relation movement between the knife 26 and the retaining element 28 forms a shield. Thus, during the commuting process by the cutting mill 1, the material 14 is substantially prevented from entering the supply channel 15 above the cutting unit 17. Therefore, supplemental filters or retaining systems are not required in order to prevent the material 14 from escaping the supply channel 15 through the opening 13.

Figure 5:
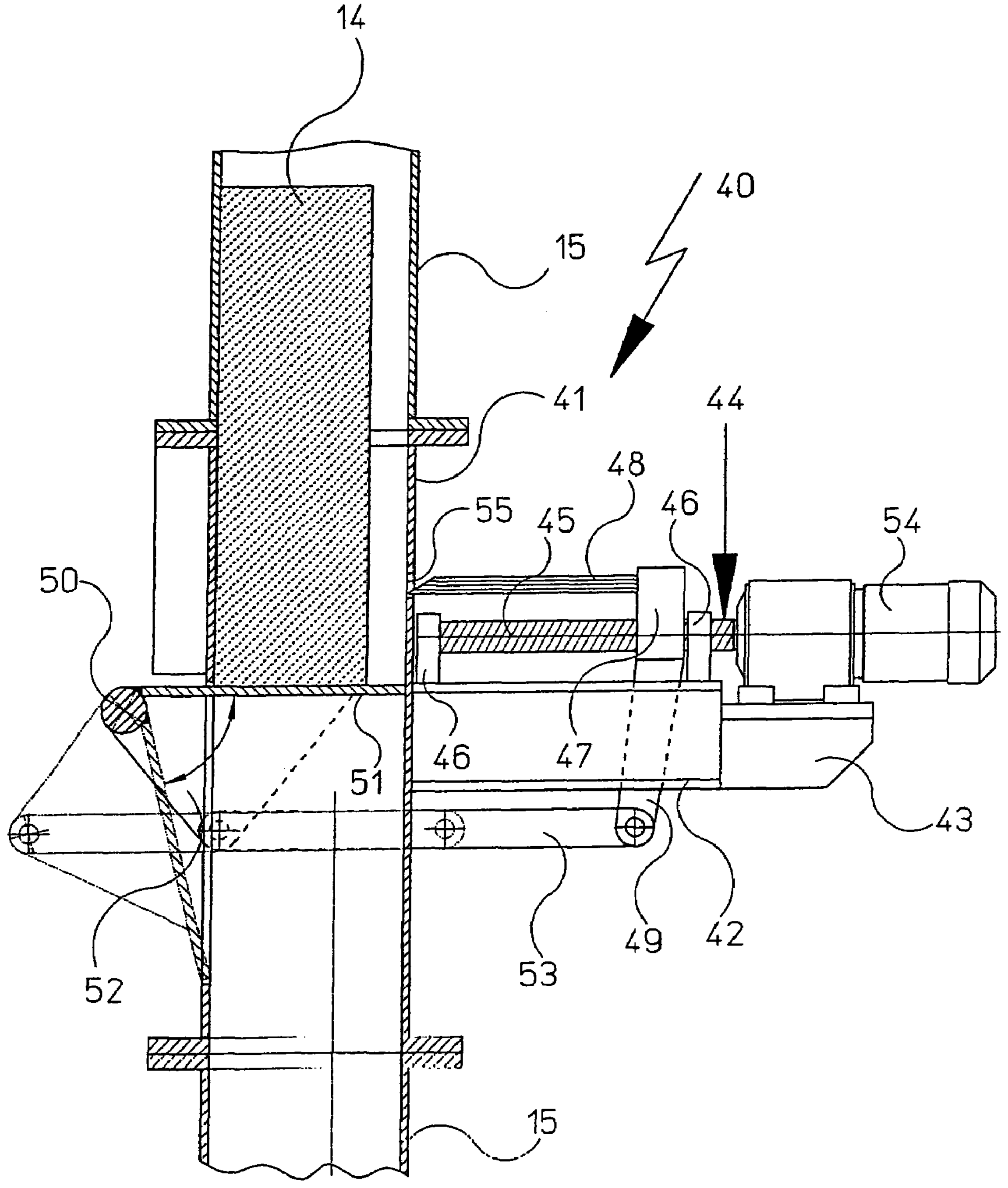
FIG. 5 is a vertical cross section of a further embodiment of the invention.

Lastly, FIG. 5 shows an alternative embodiment of a cutting unit in its basic components. Again, the middle section of a supply channel 15 is illustrated having a cutting unit 40 interposed therein. The cutting unit 40 has a tubular knife guide 41 with a cross section corresponding to that of the supply channel 15. Approximately half-way up and mounted laterally to the knife guide 41, there is a cantilever 42, which extends transversely to the longitudinal extension direction of the supply channel 15. The cantilever 42 serves as the receptacle for a spindle drive 44. For this purpose, two bearings 46 are arranged on the top side of the cantilever 42, in which the spindle 45 is positioned.

The free end of the cantilever 42 supports a console 43, on which a stepping motor 54 is arranged, with the aid of which the spindle 45 is relocatable during rotation. A knife holder 47 having a threaded bore is positioned on the spindle 45 and is movable along the spindle 45 during its rotation. The knife holder 47 supports the knife 48 in a parallel orientation to the cross section plane of the supply channel 15. At the level of the knife 48, a suitable opening 55 is provided in the knife guide 41 for the passage of the knife 48. In addition, a rigid lever 49 extends from the bottom side of the knife holder 47.

On the side of the cutting unit 40 that is opposite the cantilever 42, there is a stationary horizontal pivot bearing 50, which extends vertically to the plan view. A retaining element 51 is pivotably mounted thereon, with a triangular shank 52 attached to its bottom side. The rigid lever 49 and the triangular shank 52 are flexibly attached to one another via a push rod 53.

The illustration in FIG. 5 again shows the starting position of the cutting unit 40 prior to the cutting process. The knife 48 is thereby completely retracted from the cross section of the supply channel 15, whereas the retaining element 51 is swiveled upwards, thus closing the supply channel 15. A bale of rubber 14 is resting on the retaining element 51 waiting to be comminuted.

By activating the stepping motor 54, the knife holder 47 is moved along the spindle 45 in the direction of the bale of rubber 14, whereby the knife 48 cuts into the bale of rubber 14. Simultaneously, a force is applied to the shank 52 via the push rod 53, which causes a gradual pivoting up of the retaining element 51. When the bale of rubber 14 is completely severed by the knife 48, the retaining element 51 opens up the entire cross section of the supply channel 15 so that the severed part of the bale of rubber 14 can pass on to the second comminuting step.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for comminuting pieces of cuttable material, the apparatus comprising:

a first comminuting stage for performing a pre-comminuting process; and a second comminuting stage for performing a fine comminuting process, the second comminuting stage including a comminuting system rotating about an axis of rotation to which the cuttable material is conveyed via a supply channel, wherein the first comminuting stage is integrated in the supply channel that conveys the cuttable material to the second comminuting stage, wherein the first comminuting stage includes a cutting unit having a knife, the cutting unit cutting a predetermined portion of the cuttable material in a plane that is substantially perpendicular to a conveying direction of the cuttable material in the supply channel after leaving the first comminuting stage, and wherein the cutting unit is provided with a retaining element, which is arranged in a conveying direction below and at a distance to the knife, and which can be moved into and out of the supply channel.

2. The apparatus according to claim 1, wherein a blade of the knife of the cutting unit is slidable across an entire cross section of the supply channel.

3. The apparatus according to claim 2, wherein the knife is supported in a knife frame, which is transversely slidable in the conveying direction.

4. The apparatus according to claim 1, wherein the cutting unit further includes a knife guide for the knife or a knife frame, which forms a portion of the supply channel in an area of the first comminuting stage, thus forming a cutting chamber.

5. The apparatus according to claim 4, wherein the knife guide includes a back stop for the blade of the knife.

6. The apparatus according to claim 1, wherein the knife is driven by at least one hydraulic cylinder piston unit or a spindle drive.

7. The apparatus according to claim 6, wherein the cutting unit further includes a knife frame that includes a yoke member, and wherein the cylinder piston unit is mounted between the yoke member and a knife guide.

8. The apparatus according to claim 1, wherein the retaining element is slidably arranged in a plane that is plane-parallel to the cutting plane for opening or closing the cross section of the supply channel.

9. The apparatus according to claim 1, wherein the retaining element is arranged so that it swivels out of a plane that is plane-parallel to the cutting plane for opening the cross section of the supply channel.

10. The apparatus according to claim 1, wherein the movement of the retaining element is coupled to the movement of the knife.

11. The apparatus according to claim 1, wherein the retaining element is provided on the cutting unit, relative to the knife, such that the supply channel can alternately be opened by the knife and the retaining element.

12. The apparatus according to claim 1, wherein the retaining element is arranged on the knife frame.

13. The apparatus according to claim 1, wherein an axial distance between knife and retaining element is adjustable.

14. The apparatus according to claim 1, wherein the apparatus has an automatic control with which the performance of the first comminuting step, on the basis of a current consumption of the second comminuting step, can be controlled.

15. The apparatus according to claim 1, wherein the second comminuting step is formed by a cutting mill.

16. The apparatus according to claim 1, wherein the pieces of cuttable material are bales of rubber.

17. A cutting unit for comminuting material, the cutting unit comprising:

a knife guide that forms a segment of a supply channel through which the material passes during a first comminuting process; and a knife having a blade that is slidable across the cross section of the supply channel in a substantially perpendicular direction to a longitudinal axis of the supply channel after the cutting unit, wherein the cutting unit is a first commuting stage of a comminuting apparatus that includes a second comminuting stage for performing a fine comminuting process on the material after the first commuting stage, the second comminuting stage including a cutting rotor rotating about an axis of rotation transverse to the direction by which the cuttable material is conveyed via the supply channel to said second comminuting stage, said cutting rotor including multiple arms each supporting a blade that is oriented parallel to the axis of rotation, with said blades of said multiple arms forming a mutual blade flight circle, said second comminuting stage also including fixed stator blades having cutting edges tangent to said blade flight circle, and wherein the cutting unit includes a retaining element, which is arranged in the conveying direction below and at a distance to the knife, and which can be moved into and out of the supply channel.

18. The cutting unit according to claim 17, wherein the knife is supported in a knife frame, which is linearly slidable in a transverse direction to the longitudinal axis of the channel segment.

19. The cutting unit according to claim 17, wherein the knife guide includes a back stop for the blade of the knife.

20. The cutting unit according to claim 17, wherein a drive for the knife is formed by at least one hydraulic cylinder piston unit or a spindle drive.

21. The cutting unit according to claim 20, wherein the knife frame includes a yoke member, and wherein the cylinder piston unit is mounted between the yoke member and the knife guide.

22. The cutting unit according to claim 17, wherein the retaining element is slidably arranged in a plane that is plane-parallel to the cutting plane for opening or closing the cross section of the supply channel.

23. The cutting unit according to claim 17, wherein, for opening the cross section of the supply channel, the retaining element can be swiveled out of a plane that is plane-parallel to the cutting plane.

24. The cutting unit according to claim 17, wherein the movement of the retaining element is coupled to the movement of the knife.

25. The cutting unit according to claim 17, wherein the retaining element is positioned on the cutting unit relative to the knife so that the supply channel can be alternately opened by the knife and the retaining element.

26. The cutting unit according to claim 17, wherein the retaining element is arranged on the knife frame.

27. The cutting unit according to claim 17, wherein the axial distance between the knife and the retaining element is adjustable.

* * * * *